US006385649B1

(12) United States Patent
Draves et al.

(10) Patent No.: US 6,385,649 B1
(45) Date of Patent: May 7, 2002

(54) ROUTERS AND METHODS FOR OPTIMAL ROUTING TABLE COMPRESSION

(75) Inventors: Richard P. Draves, Seattle, WA (US); Christopher Kevin King, Somerville, MA (US); Srinivasan Venkatachary, St. Louis, MO (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/188,014

(22) Filed: Nov. 6, 1998

(51) Int. Cl.$^7$ ............................................... H04L 12/28
(52) U.S. Cl. ...................... 709/224; 709/220; 370/392
(58) Field of Search .................. 370/392, 60; 709/200, 709/214, 224, 238, 220, 202, 247; 711/718

(56) References Cited

U.S. PATENT DOCUMENTS

| | | | |
|---|---|---|---|
| 5,095,480 A | | 3/1992 | Fenner ...................... 370/94.1 |
| 5,490,258 A | * | 2/1996 | Fenner ...................... 709/200 |
| 5,546,390 A | * | 8/1996 | Stone ........................ 370/60 |
| 5,751,971 A | * | 5/1998 | Dobbins et al. ............ 709/238 |
| 5,826,262 A | | 10/1998 | Bui et al. ...................... 707/7 |
| 5,933,849 A | * | 8/1999 | Srbjic et al. ................ 711/718 |
| 6,011,795 A | | 1/2000 | Varghese et al. ............ 370/392 |
| 6,018,524 A | * | 1/2000 | Turner et al. ............... 370/392 |
| 6,061,712 A | | 5/2000 | Tzeng ........................ 709/202 |
| 6,067,574 A | | 5/2000 | Tzeng ........................ 709/247 |
| 6,192,051 B1 | * | 2/2001 | Lipman et al. ............. 370/389 |

FOREIGN PATENT DOCUMENTS

GB        2 284 730        6/1995

* cited by examiner

Primary Examiner—Ario Etienne
Assistant Examiner—Khanh Quang Dinh
(74) Attorney, Agent, or Firm—Lee & Hayes, PLLC

(57) ABSTRACT

A method for compressing a routing table involves constructing a binary tree representation of the routing table. The compression method makes three passes through the tree. In a first pass, the compression method propagates routing information down to the tree leaves. During this pass, the program assigns every leaf node in the tree an associated next hop or an inherited next hop from a higher level ancestral node. In a second pass, the compression method migrates prevalent next hops up the tree. This bottom up pass involves forming a set of next hops at a parent node by supernetting the sets of next hops A and B for a pair of child nodes corresponding to the parent node, according to the following operation:

$$A*B = A \cup B, \text{ if } A \cap B = \phi$$

$$A \cap B, \text{ if } A \cap B \neq \phi$$

where $A*B$ is a set of next hops formed at the parent node. In the third pass, the compression method eliminates redundant branches in the tree. This top down pass begins at a parent node and selects a next hop from a parent node. The method then examines a child node branching from the parent node to determine whether the selected next hop is an element of next hops for the child node. If it is, the method eliminates the next hops for the child node. After the tree is restructured by the three-pass process, the compression method converts it back to a new routing table.

24 Claims, 7 Drawing Sheets

Original Tree

Tree After Pass 1

Tree After Pass 2

Tree During Pass 3

Tree After Pass 3

ROUTERS AND METHODS FOR OPTIMAL ROUTING TABLE COMPRESSION

TECHNICAL FIELD

This invention relates to network routers and more particularly, to methods for compressing routing tables used by the routers to route network messages.

BACKGROUND

Routers are specialized computing devices that route digital messages over a network. Routers receive messages from one location (e.g., source computer or another router) and forward them to the next destination (e.g., destination computer or another router) over the most efficient available path.

Routers use routing tables to direct message traffic over a network. Routing tables have multiple entries (e.g., thousands to tens of thousands), with each entry being an address of a destination device. For instance, in the Internet context, each entry consists of the 32-bit IP (Internet Protocol) address such as "192.56.7.48". The IP address may also include a prefix length, such as 8, 16, or 24. The prefix lengths specify how many bits a router should consider for a next route. For instance, if the IP address "192.56.7.48" is assigned a prefix length of "16", the router need only consider the first two bytes to determine a next route and may effectively read the IP address as "192.56.0.0".

Associated with each entry in the routing table is a "next hop" value that indexes into a second table. The second or "next hop" table has fewer entries (e.g., 10–100 entries) to identify IP addresses of a next router or destination port in the network. For instance, the IP address "192.56.7.48/16" may have an associated next hop value of "17", meaning that the IP address for the next router is at location 17 in the next hop table.

The router uses the routing table and next hop table to route messages most efficiently through the network. When a packet arrives at a router, the router first finds the address in the routing table that provides the closest match to the destination address. The general rule is that the IP address with the longest-matching prefix in comparison to the destination address is selected. The router then locates the next hop associated with the selected IP address and routes the packet to the next router referenced by the IP address in the next hop table indexed by the next hop. There are many different high-speed algorithms to quickly look up addresses in the routing and next hop tables.

Due to the explosive growth of content being made available on the World Wide Web, the Internet is rapidly growing to fill every corner of the world. The demands of the Internet backbone routers are commensurately increasing. Nodes are being added to the network at an extremely fast rate. It is estimated that the number of routes in the Internet backbone has been growing by 10,000 routes per year. More sophisticated and faster routers are being developed, with larger routing tables, to accommodate the increasing number of routes. To improve the speed and reliability of routers, it is desirable to reduce the size of the routing table in ways that do not harm the functionality or efficiency of the router.

Toward this end, this invention is directed to techniques for reducing the size of the routing table.

SUMMARY

This invention concerns routers and methods for compressing router tables employed in routers. The methods produce smaller, yet functionally equivalent tables.

In one implementation, a method for compressing a routing table involves constructing a binary tree representation of the routing table. The binary tree has multiple nodes, wherein parent nodes at one level branch to zero, one, or two child nodes at a next lower level. The compression method makes three passes through the tree. In a first pass, the compression method propagates routing information down to the leaf nodes of the tree (i.e., nodes that do not branch to lower children nodes). During this pass, the program assigns every leaf node in the tree an associated next hop or an inherited next hop from a higher level ancestral node.

In a second pass, the compression method migrates the more prevalent next hops up the tree. This bottom up pass involves forming a set of next hops at a parent node by supernetting the sets of next hops A and B for a pair of child nodes corresponding to the parent node, according to the following operation:

$$A*B = A \cup B, \text{ if } A \cap B = \phi$$

$$A \cap B, \text{ if } A \cap B \neq \phi$$

where "A*B" is the set of next hops formed at the parent node.

In the third pass, the compression method eliminates redundant branches in the tree. This top down pass begins at the root node, and subsequently each parent node, and selects a next hop from a parent node. The method then examines a child node branching from the parent node to determine whether the selected next hop is an element of next hops for the child node. If it is, the method eliminates the next hops for the child node.

After the three-pass process restructures the tree, the compression method converts the free back to a new routing table.

DETAILED DESCRIPTION

This invention concerns routers and methods for compressing routing tables to smaller size, yet functionally equivalent tables. The general context of a network structure and router are described first, followed by a description of the compression processes.

Exemplary Network Architecture

Figure 1:
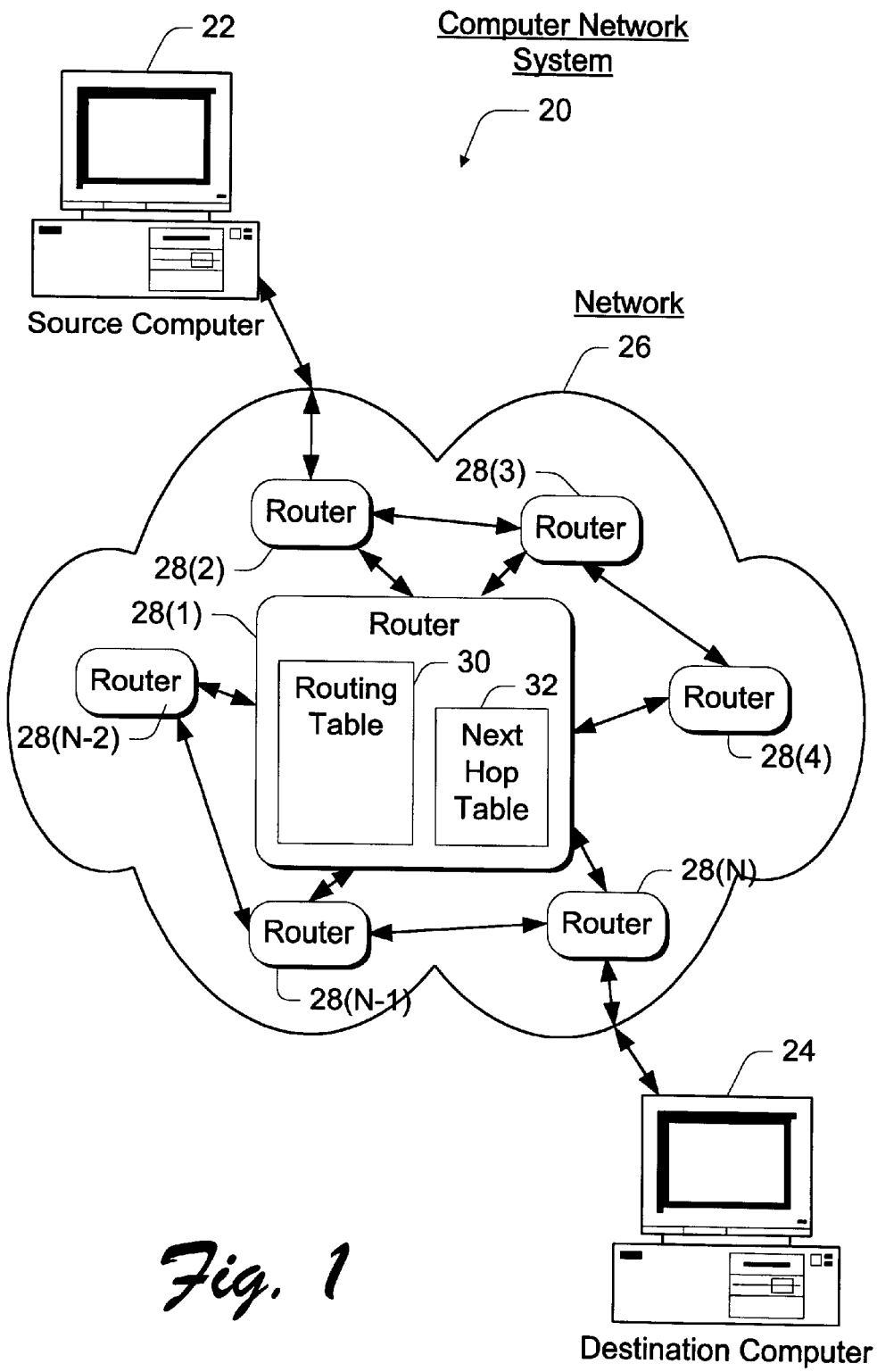
FIG. 1 is a diagrammatic illustration of a computer network system.

FIG. 1 shows a computer network system 20 having a source computer 22 and a destination computer 24 connected via a network 26. The network 26 comprises multiple interconnected routers 28(1), 28(2), ..., 28(N). Messages originating from the source computer 22 are routed over the network 26, through selected ones of the routers 28(1)–28(N), to the destination computer 24. The network 26 is representative of a public network (e.g., Internet), a LAN (local area network), and a WAN (wide area network). For purposes of continuing discussion, the system is described in the context of the Internet in which messages are transferred in IP (Internet Protocol) packets that contain IP addresses of the source and destination computers.

Each router 28 maintains a large routing table 30 and a condensed next hop table 32. The routing table holds IP addresses of other nodes (i.e., routers and/or computers) on the network, whereas the next hop table 32 holds IP address of directly coupled neighboring nodes. Each IP address in the routing table 30 indexes to one or more next hop addresses in the next hop table 32.

Exemplary Router

Figure 2:
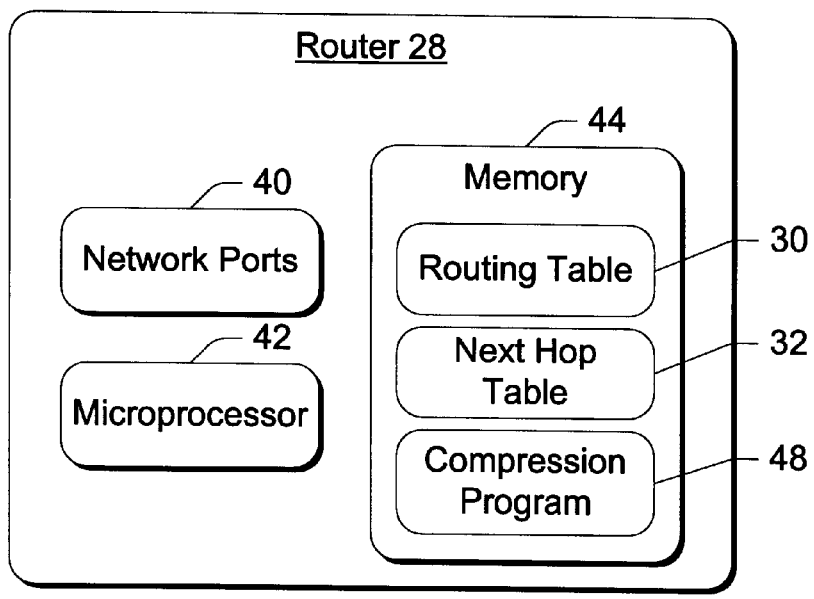
FIG. 2 is a block diagram of a router.

FIG. 2 shows an exemplary router 28. It has multiple ports 40 that provide an I/O interface with other nodes in the network. The router 28 also has a microprocessor 42 and memory 44 (e.g., RAM, ROM, EEPROM, hard disk, etc.). The routing table 30 and next hop table 32 are stored in memory 44.

The router 28 is configured with technology to process an existing routing table and compress it to a reduced size, yet functionally equivalent table. In the illustrated implementation, a routing table compression program 48 is stored in memory 44 and executed on processor 42 to compress the routing table. In another implementation, the table compression technology is embodied in an application specific integrated circuit (ASIC) or other IC device.

It is also noted that the architecture shown in FIG. 2 can be representative of other computing devices, such as a general-purpose computer.

General Compression Process

Figure 3:
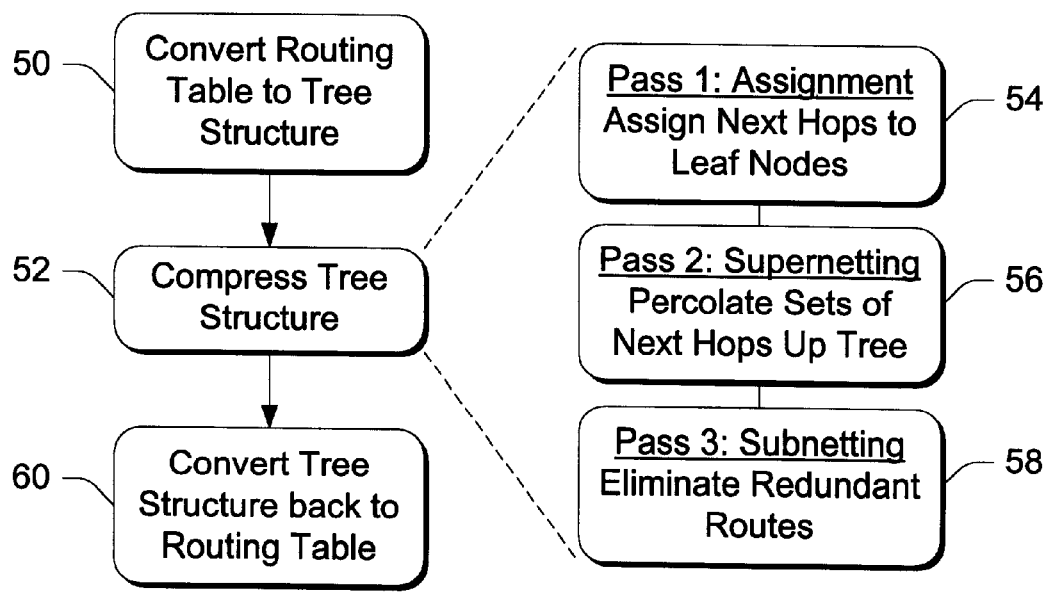
FIG. 3 is a flow diagram showing steps in a method for compressing a routing table.

FIG. 3 shows the general process steps involved in compressing a routing table. At step 50, the compression program 48 converts the routing table 30 into a binary tree structure that represents the address prefixes in the routing table. The tree is stored in volatile memory 44 during the compression process.

Figure 4:
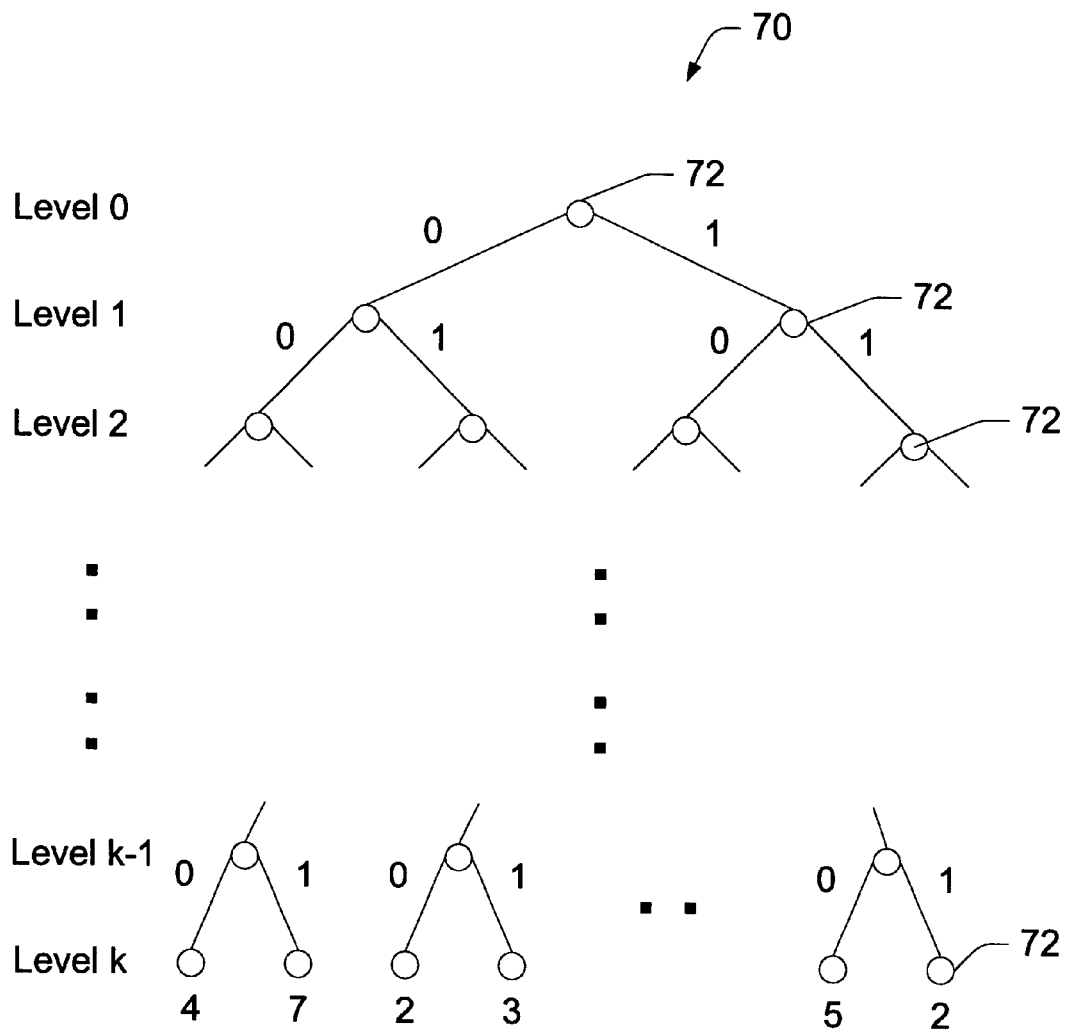
FIG. 4 is a diagrammatic illustration of a binary tree structure representing routes in a routing table.

FIG. 4 shows a binary tree structure 70. It comprises a hierarchy of nodes 72 arranged in multiple levels. For 32-bit IP address prefixes, there are 33 levels (i.e., k=0 to 32) in the tree structure. Most nodes branch to two lower level nodes, with one branch representing a binary "1" condition and the other branch representing a binary "0" condition. The two lower level nodes are referred to as "child" nodes of the common or "parent" node. Two nodes having a common parent node are referred to as "sibling" nodes. Childless nodes are referred to as "leaves" because they form termination points for their branches.

Each successive bit in an IP address prefix corresponds to a link from a parent node to a child node in the tree. A "0" bit in the prefix corresponds to the left child node and a "1" bit corresponds to the right child node. The nodes 72 are labeled with next hop values, typically a small integer or a set of small integers.

At step 52, the compression program 48 compresses the tree structure 70. The compression program 48 employs a three-pass process, as represented by substeps 54, 56, and 58. In the first pass (step 54), the compression program propagates routing information down to the tree leaves. During this pass, the program assigns every leaf node in the tree an associated next hop or an inherited next hop from a higher level ancestral node.

In the second pass (step 56), the compression program finds the most prevalent next hops by a supernetting process that involves percolating sets of next hops from the leaf nodes up toward the root node. The program traverses the tree 70 from bottom to the top, beginning with the leaf nodes at the bottom level k. The compression program examines two sibling nodes A and B and assigns their next hops to the parent node using a defined operation, which is given as follows:

A*B=A "intersect" B if A "intersect" B is non empty; or
A "union" B if A "intersect" B is empty.

The result "A*B" is the set of next hops formed the parent node. The effect of the second pass is to migrate the most popular next hop values to the top of the tree. In the context of the routing table, the supernetting process propagates sets of the most-popular next hops from more-specific routes (i.e., routes with longer IP prefixes) to more-general routes (i.e., routes with shorter IP prefixes).

In the third pass (step 58), the compression program eliminates redundant routes using a top-down subnetting process. The third pass begins at the root node (i.e., level 0) of the tree 70 and selects a next hop from the set of possible values. The compression program repeatedly tests each descending node as follows:

Test: If the selected parent next hop is an element of the set of child next hops, the set of child next hops is removed; otherwise, pick a new next hop from the set of child next hops.

The new child next hop can be picked intelligently or randomly, with the intelligent approach attempting to select states that tend not to change the tree structure unnecessarily without gain. The third pass effectively eliminates non-useful branches and nodes from the tree, thereby reducing the overall tree structure.

At step 60, the compression program converts the tree back into a routing table of IP addresses. The new routing table is smaller than the original table, but otherwise is functionally equivalent to the original table.

The three pass process offer many advantages. Intuitively, shorter prefixes at or near the root of the tree should route to the most popular or prevalent next hops. Longer prefixes, near the leaves of the tree, should route to less prevalent next hops. The three-pass process moves the most prevalent next hops up to the tree root and the less prevalent next hops down toward the leaves, while concurrently pruning the maximum number of routes from the tree.

The compression process, given a routing table that provides forwarding information for IP addresses using longest prefix match, provides a routing table which (a) provides the same forwarding information and (b) has the least possible number of entries. The process has been shown in experiments using IPv4 prefixes to reduce the number of prefixes in a large backbone router by approximately 40%.

Detailed Example of Compression Step 52

Figure 5:
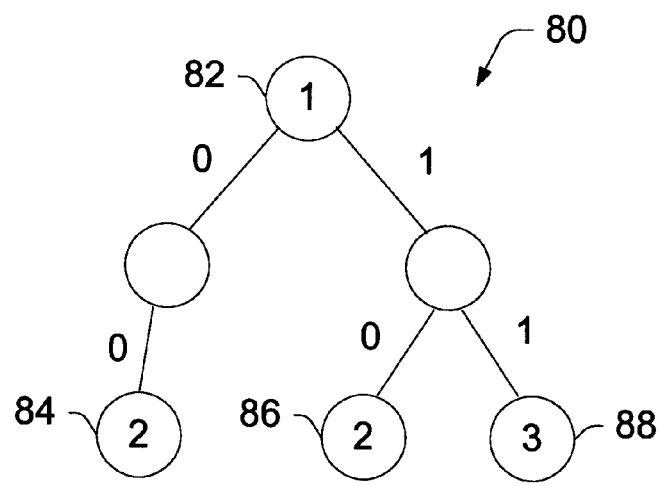
FIG. 5 is a diagrammatic illustration of a binary tree representing four routes.

FIG. 5 shows a simplified, but example binary tree 80 constructed from a set of address prefixes for four routes. Table 1 lists the routes and associated next hops to index into the next hop table 32. Table 1 also lists the corresponding nodes that are labeled with the next hop values.

| IP Address/Next Hop | Node |
|---|---|
| * → 1 | 82 |
| 00* → 2 | 84 |
| 10* → 2 | 86 |
| 11* → 3 | 88 |

The root node 82 represents a null prefix, with a default route referenced by the next hop value 1. Node 84 represents the address prefix 00*, and the next hop value associated with this prefix is 2. Node 86 represents the address prefix 10*, with an associated next hop value of 2. Node 88 represents the address prefix 11* with an associated next hop value of 3.

Pass 1: Assign Next Hops to Leaf Nodes (Step 54)

The first pass of the compression step 52 (i.e., step 54 in FIG. 3) normalizes the binary tree representation of the routing table, in preparation for the second and third passes. It ensures that every node in the tree has either zero or two children nodes. The first pass creates new leaf nodes and initializes the next hop for a new node with the next hop that the new node inherits from its nearest ancestor that has a next hop.

The first pass might use a pre-order traversal of the binary tree or alternatively a traversal by levels from the root down. In either case, the traversal pushes next hop values down from parent nodes to children nodes that do not have a next hop, creating new children nodes when a parent node has only one child.

Figure 6:
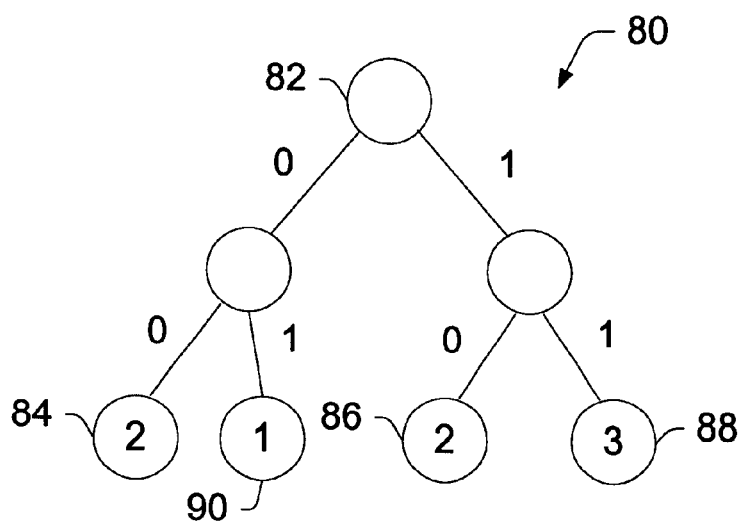
FIG. 6 is a diagrammatic illustration of the FIG. 5 binary tree after a first pass in the compression method.

FIG. 6 shows the binary tree 80 after the first pass is completed. Notice that the first pass created a new leaf node 90 addressed by the prefix 01*. This new leaf node 80 inherits the next hop of its closest ancestor, which in this case is the next hop value 1 from the grandparent root node 82. Once the tree is fully populated with leaf nodes, the next hops for interior nodes are no longer relevant and may be discarded. In this example, the next hop value 1 for the root node 82 is discarded.

Pass 2: Supernetting (Step 56)

The second pass of the compression step 52 (i.e., step 56 in FIG. 3) calculates the most prevalent next hops of the routing table by percolating sets of popular next hops up the tree. The second pass employs a bottom up traversal beginning with the leaf nodes 84, 86, 88, and 90. At each parent node visited in the bottom up traversal, a set of next hops A*B for the parent node in calculated based upon the next hops found in the children nodes A and B, according to the operation:

$$A*B = A \cup B, \text{ if } A \cap B = \phi$$

$$A \cap B, \text{ if } A \cap B \neq \phi$$

If there are any next hops in common between the two child nodes (i.e., $A \cap B \neq \phi$), they are the next hops that are most prevalent at the level of the parent node. Accordingly, only the common next hops are migrated up to the parent node according to the intersect operation $A \cap B$. Otherwise, if there are no next hops in common between the two child nodes (i.e., $A \cap B = \phi$), all of the next hops from the children nodes are carried up to the parent node according to the union operation $A \cup B$. When the second pass is complete, every node in the tree is labeled with a set of potential next hops.

Figure 7:
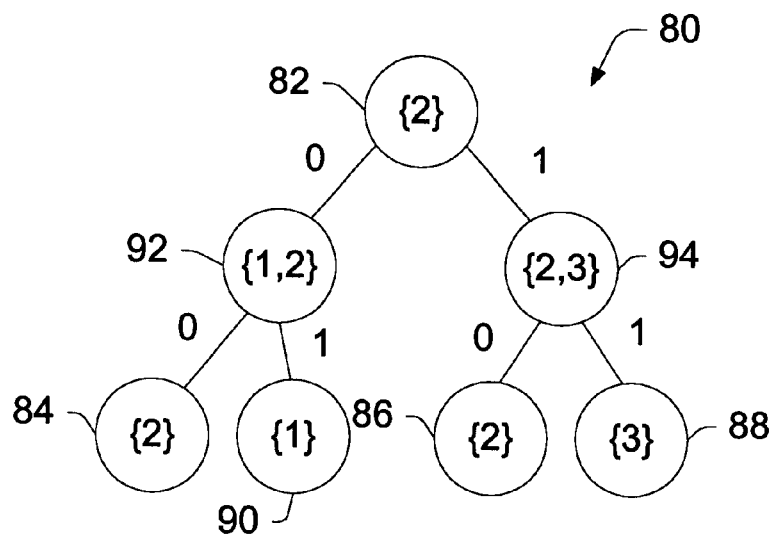
FIG. 7 is a diagrammatic illustration of the FIG. 5 binary tree after a second pass in the compression method.

FIG. 7 shows the binary tree 80 after the second pass is completed. For sibling nodes 84 and 90, "A" is the set of next hops of node 84 (i.e., {2}) and "B" is the set of next hops of node 90 (i.e., {1}). The second pass determines that sets A and B have no common next hop and hence carries the union of these sets {1,2} to their parent node 92. Similarly, for sibling nodes 86 and 88, where "A" is the set of next hops of node 86 (i.e., {2}) and "B" is the set of next hops of node 88 (i.e., {3}), the second pass finds that the sets have no common next hop and hence carries the union of these sets {2,3} to their parent node 94.

Now, for sibling nodes 92 and 94, where "A" is the set of next hops of node 92 (i.e., {1,2}) and "B" is the get of next hops of node 94 (i.e., {2,3}), the second pass finds that the sets have a common next hop of 2 and propagates the set intersection of these two sets (i.e., {2}) to the parent and root node 82. Notice that the second pass effectively migrates the most prevalent next hop 2 to the root node 82.

Pass 3: Subnetting (Step 58)

The third pass of the compression step 52 (i.e., step 56 in FIG. 3) moves down the tree selecting next hops for prefixes and eliminating redundant routes via subnetting. The third pass can use either a pre-order traversal of the tree or a traversal by levels from the root down. Each node visited has a set of possible next hops, computed in the second pass. Except for the root node, the node will inherit a next hop from the closest ancestor node that has a next hop. If the inherited next hop is a member of the node's set of potential next hops, the node does not need a next hop of its own: it is inheriting an appropriate next hop. However, if the inherited next hop is not a member of the node's set of potential next hops, the node does need a next hop. Any member of the node's set of potential next hops may be chosen as the node's next hop. This process is summarized by the following test:

Test: If the selected parent next hop is an element of the set of child next hops, the set of child next hops is removed; otherwise pick a new next hop from the set of child next hops.

After the second pass, the root node is labeled with a singleton next hop set {2}, so the third pass selects the next hop 2 for the root. Because next hop 2 is a member of the sets {1,2} and {2,3} of the two children nodes 92 and 94, these sets of next hops at the root's children nodes may be removed. Beginning at node 92, the two children nodes 84 and 90 have respective sets {2} and {1}. The process picks the next hop 2 for the child node 84 and the next hop 1 for the child node 90. Similarly, with respect to parent node 94, the process picks the next hop 2 for the child node 86 and the next hop 3 for the child node 88.

Figure 8:
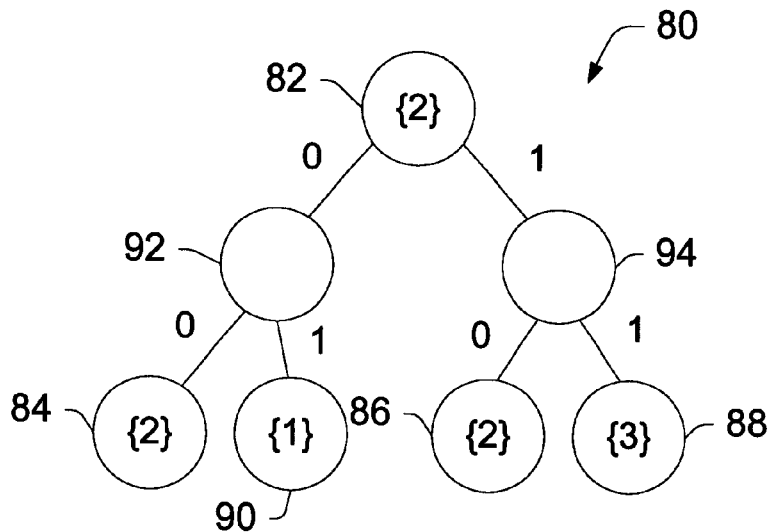
FIG. 8 is a diagrammatic illustration of the FIG. 5 binary tree during a third pass in the compression method.

FIG. 8 shows the binary tree 80 during the third pass after the top down test procedure visits all nodes. As the third pass proceeds, the tree 80 may have redundant routes that can be removed to compress the table. In this example, two leaf nodes 84 and 86 do not need next hops because the next hops are contained in the root set. Hence, these leaf nodes can inherit an appropriate next hop from the root and may be omitted as redundant from the tree. Alternatively, the redundant routes can be removed at the end of the third pass.

Figure 9:
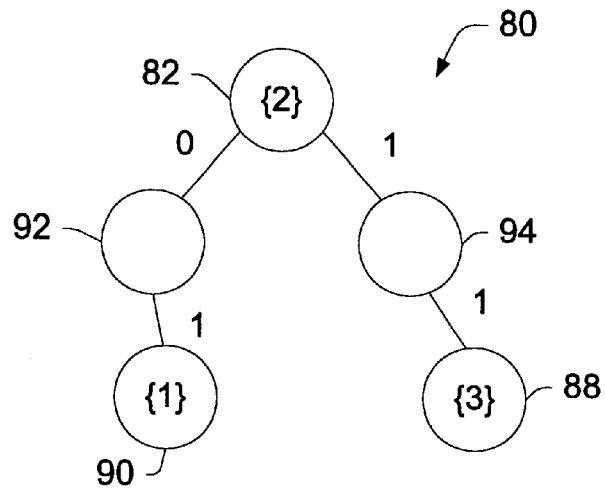
FIG. 9 is a diagrammatic illustration of the FIG. 5 binary tree after a third pass in the compression method.

FIG. 9 shows the binary tree 80 after the third pass is completed. The final tree has two leaf nodes 88 and 90, and three routes *, 01* and 11*. Table 2 lists the routes and associated next hop value for the compressed free, as well as the corresponding node.

| IP Address/Next Hop | Node |
|---|---|
| * → 2 | 82 |
| 01* → 1 | 90 |
| 11* → 3 | 88 |

In comparison to the original routing table as represented by the tree of FIG. 5 and Table 1, the resultant tree represented by FIG. 9 and Table 2 has one less route and is more efficient in that the more prevalent next hop 2 is now at the root node and not at the leaf nodes.

The three-pass compression process yields an output routing table (FIG. 9) that has the smallest number of prefixes possible while still maintaining the same forwarding behavior as the original routing table (FIG. 5). In the third pass, the compression program may choose a next hop from a set of potential next hops. This means that the process may produce many different output routing tables for a given input table. However, all of the possible output routing tables are the same size and functionally equivalent.

Alternative Implementations

There are several ways to reduce the number of steps in the compression process to thereby improve performance. One way is to combine the first and second passes. When the combined pass comes across a parent node with only one child node, the process can at that time create a new child node and assign an inherited next hop to the new child. Any intermediate nodes between the new child and the ancestor from which it's inheriting can also be assigned this inherited next hop. This may help speed up later inheritance operations.

For instance, consider the tree structure in FIG. 6. During the first pass when the compression program creates a new child node 90, it could then assign the next hop 2 to the parent node 92.

Another performance improvement saves some work in the third pass by anticipating it in the second pass. In the second pass, when a parent node is assigned the intersection of its child nodes' sets of potential next hops, the next hop values for the two child nodes can be deleted. For example, consider the children nodes 92 and 94 in FIG. 7. The parent node 82 is assigned the intersection of these nodes' next hops, {1,2} and {2,3}, or set {2}. At this point in the second pass, the compression program can delete the sets {1,2} and {2,3} at the nodes 92 and 94 as they would otherwise be removed during the third pass as shown in FIG. 8.

This performance improvement immediately prunes those prefixes from the routing table. This is a safe optimization because a member of the intersection of two sets is by definition a member of both sets. In the third pass, that parent node will be assigned a next hop from the intersection (or it will inherit such a next hop). If the third pass processed the child nodes, it would see that they inherit a next hop that is a member of their potential set, and prune them at that time.

In another performance improvement, it may be advantageous in some situations to compress a routing table without changing it "unnecessarily". Two small modifications to the selection of next hops in the third pass improve stability so as not to change a table unnecessarily. During the third pass, suppose that compression program must choose a next hop for a parent node from a set X of potential next hops. If this nodes' prefix had a next hop in the input routing table, and that next hop is a member of X, then it is the logical choice. This improves stability because this prefix's next hop will be preserved.

If compression program must choose a next hop for a parent node but its prefix did not have a next hop in the input routing table, then to improve stability one would like to remove the prefix from the optimized routing table instead of assigning it a next hop. This is a safe modification if the parent node's set of potential next hops was formed by union of its two child nodes' sets. Either way, the parent node and its two child nodes generate two routes in the output routing table.

The example described above with respect to FIGS. 5–9 inherently makes two assumptions. The first assumption is that the input routing table contains a default route (a next hop for the null prefix). The second assumption is that the input table contains a single next hop for its prefixes. However, the processes described above can be used in situations where the assumptions do not hold.

With respect to the first assumption, some backbone routers in the Internet use "default-free" routing tables. In such cases, one approach is to introduce a default route to a dummy next hop of 0, at the beginning of the first pass. At the end of the third pass, if the dummy route at the root is present in the output table, it is removed. Note that the output table may contain routes to next hop 0. Forwarding to next hop 0 is simply taken as an error, just as if no matching prefix were found.

With respect to the second assumption that the input table contains only one next hop, there are situations where routing tables employ multiple next hops. There are several ways to accommodate multiple next hops. First, it is possible to choose the best next hop for each prefix, by some metric, before applying the compression procedure to optimize the resulting routing table. This is an appropriate method if the metric can pick a single best next hop from the set of next hops for a prefix.

If several next hops tie for best, the compression process can use the flexibility it gets by having multiple next hops from which to choose to achieve better compression. In this technique, the input table contains multiple next hops. The first pass is modified slightly so that a new child node may inherit multiple next hops from its ancestor. The operation of the second and third passes is not affected, This approach allows the compression process to achieve greater compression because it has a better chance of finding prevalent next hops at higher levels of the tree. This approach does not, however, preserve the sets of next hops in the input routing table.

If it is important to preserve the sets of next hops in the input routing table, another modified approach is to create "virtual" next hops, where each virtual next hop represents a different set of next hops found in the input routing table. The compression program optimizes using the virtual next hops, so instead of manipulating sets of next hops it is really manipulating sets of sets of next hops.

Path Compression Optimization

Figure 10:
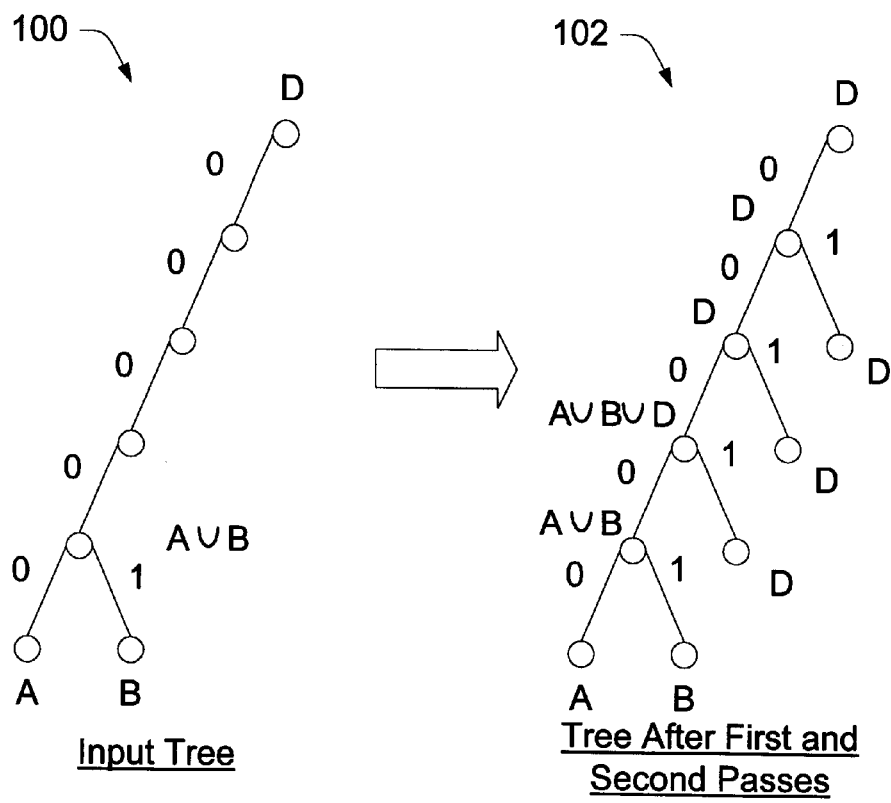
FIG. 10 is a diagrammatic illustration of a portion of a binary tree having multiple single branches and how that tree is processed as a result of the first and second passes in the compression method.

Another enhancing modification is to apply path compression techniques selectively to portions of the binary tree to improve compression speed. FIG. 10 shows an input tree 100 and a processed tree 102 after the first and second passes are completed. The input tree 100 has a root node with a next hop set D and leaf nodes with next hop sets A and B. Between the root and leaf nodes are many single branching nodes. The first pass of the compression method creates children nodes from each parent with only one child and assigns an inherited next hop set from the nearest ancestor, which in this case is the root node. Thus, all new child nodes are assigned the next hop set D, as shown in processed tree 102.

Applying the second pass to the tree causes the most prevalent next hop sets to migrate upward. In this case, the next hop set D eventually ends up at the root node D. Many duplicative steps went into achieving this end result. Moreover, this work appears to be wasted since the next hop set D at the root node did not change as a result of the first and second steps.

The number of operations to perform the compression is given by the formula O(nw) where "O" is a well-understood notation that essentially means that an upper bound on a number of operations is proportional to "nw". The variable "n" is the number of prefixes (or routes) represented by a binary tree and the variable "w" is the length of the prefixes. For 32-bit IP addresses, the number of operations is 32n.

Figure 11:
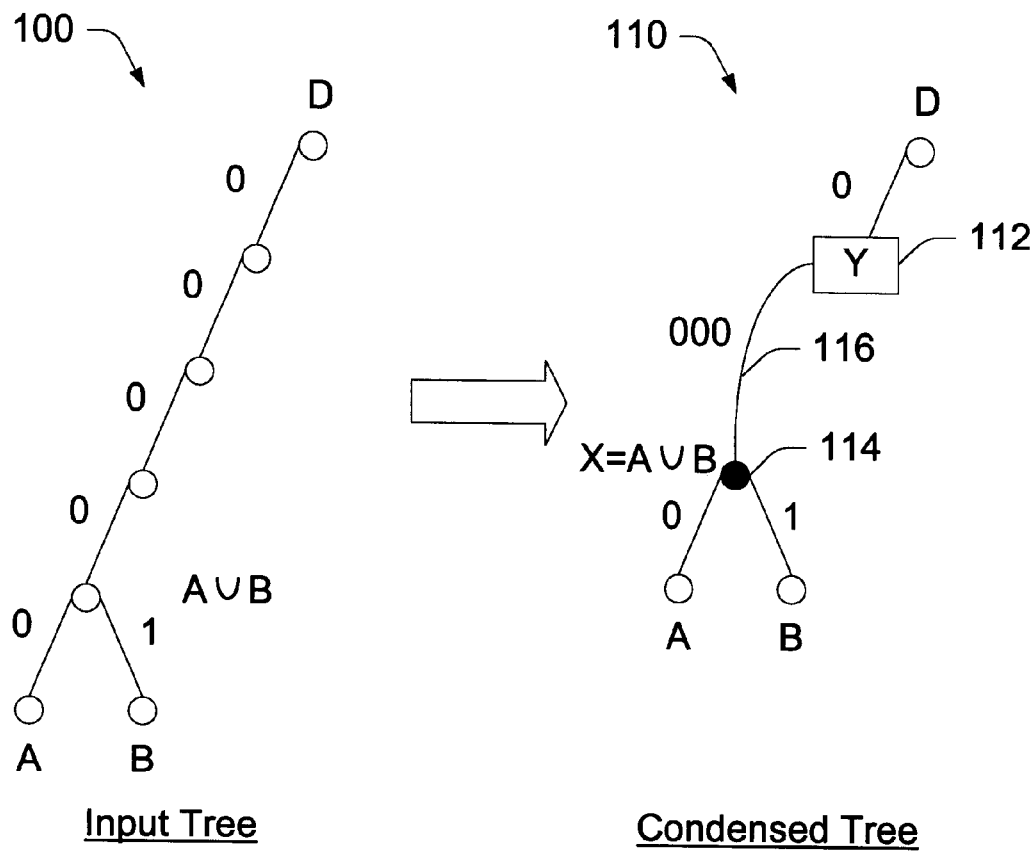
FIG. 11 is a diagrammatic illustration of a portion of a binary tree having multiple single branches and how the single branches can be compressed using path compression.

Path compression techniques can be used to further reduce the number of operations from O(nw) to O(n). FIG. 11 shows a condensed representation 110 of the input tree 100. A box 112 represents the parent node before a string of single branching nodes and the dot 114 represents the child node at the end of the string. The curved path 116 represents the string of branches. The variable X describes the set of next hops at node 114 (i.e., A∪B) and the variable Y describes the set of next hops at node 112 (i.e., D). Upon encountering this structure, the compression program employs the following operations:

if $X \cap Y = \phi$, assign Y at first node and X at last node
if $X \cap Y \neq \phi$, assign $X \cap Y$ at first node and $X \cap Y$ at last node In this case, the set of next hops X (i.e., A∪B) at "dot" node 114 has no common value with the set D at "box" node 112. Accordingly, the "box" node 112 is assigned the get D and the "dot" node 114 is assigned the set X.

In the condensed tree 100, when there are "n" prefixes, there can be at most 3n nodes. Accordingly, the maximum number of operations are at most "3n". Box nodes are used only when the compressed path in them is of length at least 2. Otherwise, dot nodes are used.

Conclusion

The compression techniques are described above in the context of compressing routing tables in routers. More generally, the same techniques may be applied to optimally reduce the size of a set of prefixes, where the prefixes are being selected according to the longest matching prefix algorithm.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for compressing a routing table comprising the following steps:

constructing a binary tree representation of the routing table, the binary tree having nodes representing various routes in the routing table;

assigning next hops to the nodes;

migrating prevalent next hops up the tree according to the following operation:

$A*B = A \cup B$, if $A \cap B = \phi$ $A \cap B$, if $A \cap B \neq \phi$ where $A*B$ is a set of next hops formed at a parent node from sets of next hops A and B for a pair of child nodes corresponding to the parent node;

eliminating redundant branches in the tree to produce an output tree; and converting the output tree to a new routing table.

2. A method for compressing a routing table comprising the following steps:

constructing a binary tree representation of the routing table, the binary tree having nodes representing various routes in the routing node;

assigning next hops to the nodes;

migrating prevalent next hops up the tree, the migrating comprising applying path compression to a series of single branches that begin at a first node and end at a last node, where X represents a set of next hops at the last node and Y represents a set of next hops at the first node, and migrating next hops up the tree according to the following operation:

if $X \cap Y = \phi$, assign Y at first node and X at last node
if $X \cap Y = \phi$, assign $X \cap Y$ at first node and $X \cap Y$ at last node eliminating redundant branches in the tree to produce an output tree; and converting the output tree to a new routing table.

3. A method as recited in claim 1, wherein the eliminating step comprises the following steps:

selecting a next hop from a closest non-empty ancestor node; and examining a child node branching from the parent node to determine whether the selected next hop is an element of next hops for the child node and if so, eliminating the next hops for the child node.

4. A routing table stored in a computer-readable medium and constructed as a result of the method as recited in claim 1.

5. A method for compressing a binary tree representation of a routing table, the binary tree having multiple nodes at multiple levels that represent various routes in the routing table wherein a parent node at one level can branch to zero, one, or two child nodes at a next lower level, some of the nodes having associated next hops, the method comprising the following steps:

normalizing the tree by creating new child nodes for parent nodes having only one child node and assigning next hops from the parent nodes to the new child nodes;

migrating prevalent next hops up the tree by supernetting, at parent nodes, sets of the next hops A and B for corresponding pairs of child nodes according to the following operation:

$A*B = A \cup B$, if $A \cap B = \phi$ $A \cap B$, if $A \cap B \neq \phi$ where $A*B$ is a set of next hops produced at the parent nodes; and subnetting down the tree to eliminate redundant branches having child nodes with at least one next hop contained in the set of next hops of corresponding closest non-empty ancestor nodes.

6. A method as recited in claim 5, wherein the normalizing, migrating, and subnetting steps are performed in three passes through the tree.

7. A method as recited in claim 5, wherein the normalizing and migrating steps are performed in a single pass through the tree.

8. A method as recited in claim 5, wherein in all event that $A*B=A \cap B$ for an individual parent node, further comprising the step of deleting the next hops at the pair of child nodes associated with the individual parent node.

9. A method as recited in claim 5, wherein the subnetting step comprises the following steps:

selecting a next hop from a closest non-empty ancestor node; and examining a child node branching from the parent node to determine whether the selected next hop is an element of next hops for the child node and if so, eliminating the next hops for the child node.

10. A method as recited in claim 9, wherein the selecting step comprises the step of selecting a next hop that attempts to avoid changing the tree structure.

11. A method for compressing a binary tree representation of a routing table, the binary tree having multiple nodes at multiple levels that represent various routes in the routing table, wherein a parent node at one level can branch to zero or two child nodes at a next lower level, the method comprising the following steps:

migrating prevalent next hops up the tree according to the following operation:

$$A*B = A \cup B, \text{ if } A \cap B = \phi$$
$$A \cap B, \text{ if } A \cap B \neq \phi$$

where $A*B$ is a set of next hops formed at a parent node from set of next hops A and B for a pair of child nodes corresponding to the parent node; and eliminating redundant branches in the tree.

12. A method as recited in claim 11, wherein in an event that $A*B=A \cap B$ for an individual parent node, further comprising the step of deleting the next hops at the pair of child nodes associated with the individual parent node in advance of the eliminating step.

13. A method as recited in claim 11, wherein the eliminating step comprises the following steps:

selecting a next hop from a closest non-empty ancestor node; and examining a child node branching from the parent node to determine whether the selected next hop is an element of next hops for the child node and if so, eliminating the next hops for the child node.

14. A method as recited in claim 13, wherein the selecting step comprises the step of selecting a next hop that attempts to avoid changing the tree structure.

15. A method as recited in claim 14, further comprising the step of eliminating any redundant routes having common IP addresses.

16. A method for processing a routing table comprising the following steps:

propagating sets of popular next hops from more-specific routes to more-general routes, where more-specific routes are defined by IP addresses with more prefix bits in comparison to IP addresses for more-general routes, by migrating the popular next hops according to the following operation:

$$A*B = AYB, \text{ if } AIB = \phi$$
$$AIB, \text{ if } AIB \neq \phi$$

where $A*B$ is a set of next hope formed from sets of next hops A and B; and selecting next hops from the sets of popular next hops to redefine the more-specific routes.

17. A method for compressing a routing table comprising the following steps:

supernetting sets of popular next hops by migrating the popular next hops according to the following operation:

$$A*B = AYB, \text{ if } AIB = \phi$$
$$AIB, \text{ if } AIB \neq \phi$$

where $A*B$ is a get of next hops formed from sets of next hops A and B; and subnetting selected next hops from the sets of popular next hops to eliminate redundant routes.

18. A router comprising:

a memory to store a routing table;

a processor coupled to the memory to route messages according to routes listed in the routing table; and a table compressor to compress the routing table stored in the memory, the table compressor constructing a binary tree representation of the routing table and assigning next hops to nodes in the tree, the table compressor migrating prevalent next hops up the tree according to the following operation:

$$A*B = AYB, \text{ if } AIB = \phi$$
$$AIB, \text{ if } AIB \neq \phi$$

where $A*B$ is a set of next hops formed at a parent node from sets of next hops A and B for a pair of child nodes corresponding to the parent node;

the table compressor eliminating redundant branches in the tree and converting the tree back to a compressed routing table.

19. A router comprising;

a memory to store a routing table;

a processor coupled to the memory to route messages according to routes listed in the routing table;

a table compressor to compress the routing table stored in the memory, the table compressor constructing a binary representation of the routing table and assigning next hops to nodes in the tree, he table compressor migrating prevalent next hops up the tree and eliminating redundant branches in the tree, the table compressor converting the tree back to a compressed routing table; and wherein the table compressor applies a path compression technique to a series of single branches that begin at a first node and end at a last node, where X represents a set of next hops at the last node and Y represents a set of next hops at the first node, the table compressor migrating next hops up the tree according to the following operation:

if $XIY=\phi$, assign Y at first node and X at last node if $XIY=\phi$, assign XIY at first node and XIY at last node.

20. A router as recited in claim 19, wherein the table compressor eliminates branches by selecting a next hop from a closest non-empty ancestor node and examining a child node branching from the parent node to determine whether the selected next hop is an element of next hops for the child node and if so, eliminating the next hops for the child node.

21. A router comprising:

a memory to store a routing table;

a processor coupled to the memory to route messages according to routes listed in the routing table; and a table compressor to compress the table stored in the memory, the table compressor propagating sets of popular next hops from more-specific routes to more-general routes, where more-specific routes are defined by IP addresses with more prefix bits in comparison to IP addresses for more-general routes;

the table compressor migrating the popular next hops according to the following operation:

$$A*B = AYB, \text{ if } AIB = \phi$$

$$AIB, \text{ if } AIB \neq \phi$$

where $A*B$ is a set of next hops formed from sets of next hops A and B; and the table compressor selecting next hops from the sets of popular next hops to redefine the more-specific routes and to eliminate redundant routes having common IP addresses.

22. A computer-readable medium comprising computer-executable instructions for performing the following steps:

normalizing the tree by creating new child nodes for parent nodes having only one child node and assigning next hops from the parent nodes to the new child nodes;

migrating prevalent next hops up the tree by supernetting, at parent nodes, sets of the next hops A and B for corresponding pairs of child nodes according to the following operation:

$$A*B = A \cup B, \text{ if } A \cap B = \phi$$

$$A \cap B, \text{ if } A \cap B \neq \phi$$

where $A*B$ is a set of next hops produced at the parent nodes; and subnetting down the tree to eliminate redundant branches having child nodes with at least one next hop contained in the set of next hops of corresponding closest non-empty ancestor nodes.

23. A computer-readable medium comprising computer-executable instructions for performing the following steps:

migrating prevalent next hops up the tree according to the following operation:

$$A*B = A \cup B, \text{ if } A \cap B = \phi$$

$$A \cap B, \text{ if } A \cap B \neq \phi$$

where $A*B$ is a set of next hops formed at a parent node from sets of next hops A and B for a pair of child nodes corresponding to the parent node; and eliminating redundant branches in the tree.

24. A computer-readable medium comprising computer-executable instructions for performing the following steps:

propagating sets of popular next hops from more-specific routes to more-general routes, where more-specific routes are defined by IP addresses with more prefix bits in comparison to IP addresses for more-general routes;

migrating the popular next hops according to the following operation:

$$A*B = AYB, \text{ if } AIB = \phi$$

$$AIB, \text{ if } AIB \neq \phi$$

where $A*B$ is a set of next hops formed from sets of next hops A and B;

selecting next hops from the sets of popular next hops to redefine the more-specific routes; and eliminating any redundant routes having common IP addresses.

* * * * *

UNITED STATES PATENT AND TRADEMARK OFFICE
CERTIFICATE OF CORRECTION

PATENT NO. : 6,385,649 B1
DATED : May 7, 2002
INVENTOR(S) : Draves et al.

It is certified that error appears in the above-identified patent and that said Letters Patent is hereby corrected as shown below:

Column 5,
Line 56, replace "in" with -- is --.

Column 6,
Line 19, replace "get" with -- set --.

Column 7,
Line 2, replace "free" with -- tree --.

Column 9,
Line 39, replace "get" with -- set ---.

Column 10,
Line 18, replace "node" with -- table --.

Column 11,
Line 7, replace "all" with -- an --.
Line 37, change "set" to -- sets --.

Column 12,
Line 4, replace "hope" with -- hops --.
Line 16, replace "get" with -- set --.
Line 46, add -- tree -- after "binary".
Line 48, replace "he" with -- the --.

UNITED STATES PATENT AND TRADEMARK OFFICE
CERTIFICATE OF CORRECTION

PATENT NO.      : 6,385,649 B1
DATED           : May 7, 2002
INVENTOR(S)     : Draves et al.

It is certified that error appears in the above-identified patent and that said Letters Patent is hereby corrected as shown below:

<u>Column 13,</u>
Line 5, add -- routing -- before "table".

Signed and Sealed this

First Day of October, 2002

*Attest:*

*Attesting Officer*

JAMES E. ROGAN
*Director of the United States Patent and Trademark Office*